US010890783B2

(12) United States Patent
Tan et al.

(10) Patent No.: US 10,890,783 B2
(45) Date of Patent: Jan. 12, 2021

(54) METHOD OF FORMING A FILM WITH A LENTICULAR LENS ARRAY

(71) Applicants: Agency for Science, Technology and Research, Singapore (SG); Temasek Polytechnic, Singapore (SG)

(72) Inventors: Beng Soon Tan, Singapore (SG); Chee Fatt Frank Chan, Singapore (SG); Yun Xu, Singapore (SG); Bee Khuan Jaslyn Law, Singapore (SG); Yee Chong Loke, Singapore (SG); Hong Yee Low, Singapore (SG)

(73) Assignees: Agency for Science, Technology and Research, Singapore (SG); Temasek Polytechnic, Singapore (SG)

( * ) Notice: Subject to any disclaimer, the term of this patent is extended or adjusted under 35 U.S.C. 154(b) by 118 days.

(21) Appl. No.: 16/198,386

(22) Filed: Nov. 21, 2018

(65) Prior Publication Data

US 2019/0094561 A1    Mar. 28, 2019

Related U.S. Application Data

(62) Division of application No. 14/648,063, filed as application No. PCT/SG2013/000507 on Nov. 29, 2013, now abandoned.

(30) Foreign Application Priority Data

Nov. 29, 2012 (SG) .............................. 201208833-2

(51) Int. Cl.
G02B 3/00    (2006.01)
G02B 27/22   (2018.01)
G02B 30/27   (2020.01)

(52) U.S. Cl.
CPC ........... *G02B 30/27* (2020.01); *G02B 3/0031* (2013.01)

(58) Field of Classification Search
CPC ............ G02B 27/2214; G02B 27/2242; G02B 27/225; G02B 3/0006–0031; G02B 3/0037–0056; G02B 3/0068
(Continued)

(56) References Cited

U.S. PATENT DOCUMENTS 7,829,906 B2   11/2010   Donofrio
8,253,780 B2    8/2012   Raymond et al.
(Continued)

FOREIGN PATENT DOCUMENTS

WO    WO-2011115577 A1    9/2011
WO    WO-2011155445 A1   12/2011
WO    WO-2014084798       6/2014

OTHER PUBLICATIONS

"U.S. Appl. No. 14/648,063, Final Office Action dated May 22, 2017", 12 pgs.
(Continued)

*Primary Examiner* — Marin Pichler
(74) *Attorney, Agent, or Firm* — Schwegman Lundberg & Woessner, P.A.

(57) ABSTRACT

According to one aspect of the invention, there is provided a method of forming a film with a lenticular lens array, the method comprising providing a substrate; providing a mold having a plurality of nano-scale to micro-scale cavities that form the lenticular lens array on the substrate; having the mold contact the substrate; and forming the lenticular lens array by allowing portions of the substrate to partially fill the plurality of cavities.

7 Claims, 6 Drawing Sheets

(58) Field of Classification Search
USPC .................................. 359/463, 455, 619–623
See application file for complete search history.

(56) References Cited

U.S. PATENT DOCUMENTS

| | | |
|---|---|---|
| 2008/0024872 A1 | 1/2008 | Dunn et al. |
| 2013/0011626 A1 | 1/2013 | Dumond et al. |
| 2013/0092229 A1* | 4/2013 | Xue .................. H01L 51/447 136/256 |
| 2013/0094079 A1 | 4/2013 | Fujishiro et al. |
| 2015/0316777 A1 | 11/2015 | Tan et al. |

OTHER PUBLICATIONS

"U.S. Appl. No. 14/648,063, Final Office Action dated May 24, 2018", 24 pgs.
"U.S. Appl. No. 14/648,063, Non Final Office Action dated Jan. 27, 2017", 11 pgs.
"U.S. Appl. No. 14/648,063, Non Final Office Action dated Oct. 17, 2017", 15 pgs.
"U.S. Appl. No. 14/648,063, Preliminary Amendment filed May 28, 2015", 5 pgs.
"U.S. Appl. No. 14/648,063, Response Filed Apr. 17, 2018 to Non Final Office Action dated Oct. 17, 2017", 11 pgs.
"U.S. Appl. No. 14/648,063, Response filed Sep. 21, 2017 to Final Office Action dated May 22, 2017", 6 pgs.
"U.S. Appl. No. 14/648,063, Response filed Dec. 6, 2016 to Restriction Requirement dated Oct. 17, 2016", 6 pgs.
"U.S. Appl. No. 14/648,063, Restriction Requirement dated Oct. 17, 2016", 8 pgs.
"U.S. Appl. No. 14/648,063m, Response filed Apr. 27, 2017 to Non Final Office Action dated Jan. 27, 2017", 7 pgs.
International Application No. PCT/SG2013/000507, International Search Report dated Feb. 20, 2014, (Feb. 20, 2014), 5 pgs.
Bogdanski, Nicolas, et al., "Thermal imprint with negligibly low residual layer", Journal of Vacuum Science & Technology B: Microelectronics and Nanometer Structures, vol. 24, issue 6, p. 2998-3001, (2006), 2998-3001.
Heyderman, L. J., et al., "Flow behaviour of thin polymer films used for hot embossing lithography", Microelectronic Engineering 54 (2000) 229-245, (Jul. 16, 2000), 229-245.
Nussbaum, Philippe, et al., "Design, fabrication and testing of microlens arrays for sensors and microsystems", Pure and Applied Optics: Journal of the European Optical Society Part A, 1997, vol. ?6, No. ?6, p. ?617-636, (1997), 617-636.

* cited by examiner

METHOD OF FORMING A FILM WITH A LENTICULAR LENS ARRAY

FIELD

The present invention relates to visual display technology. In particular, it relates to the design of a lens array for adapting a visual display device for spectacles-free three-dimensional viewing.

BACKGROUND

Current spectacles-free three-dimensional (3D) display technology using an optical element on a plastic film on top of a mobile devices' display typically utilizes one of two types of optical element technologies: parallax barrier technology or lenticular lens array technology. Lenticular lens array technology has an advantage over parallax barrier technology in terms of higher light transmitivity.

Yet, currently available 3D films utilizing lenticular lens array technology exhibit visible surface roughness on the film. This roughness translates to poor quality display images having coarse granularity and lacking sharp contours when the film is used while the display is operating in a two-dimensional (2D) mode. When operating in 3D mode, the visible roughness on the film creates artifacts that are perceptible to a viewer such as blended images (crosstalk) causing noticeable transitions between viewing zones and moiré-like artifacts. The cause of this roughness is due to two factors: a large lens width and a surface roughness of the fabricated lens. A width of typical lenticular lenses in existing 3D film is large, with dimensions in the micron-size range around 300 µm to 600 µm. This size is due to limitations in tooling accuracy of existing fabrication means, such as conventional milling techniques. The roughness on the surface profile of the fabricated lens is also due to the inherencies of current tooling techniques, such as machine milling and laser writing, which generates a high degree of surface roughness.

An alternative method of fabricating lenticular lens arrays resulting in low dimension, smooth lenticular lenses uses a thermal resist reflow method. In this method, conventional photolithography (which is known to be able to achieve feature widths down to the optical diffraction limit (approximately 250 nm)) is first carried out to fabricate grating resist structures onto substrates. Then, through a controlled thermal resist reflow process, lenticular lens arrays can be formed as the melted polymer of the grating structure is reshaped into a reduced surface area lenticular profile structure. At the same time, the reflow process helps smoothen out any surface roughness of the lenticular lens profile.

Unfortunately, there is a limitation of the above-mentioned resist reflow method in the fabrication of the lenticular lens. There is a minimum aspect ratio (height(H)/width (W)) of approximately 1/23, or 0.04, below which the reflowed lens profile becomes deformed in the middle when using this method (from Nussbaum P, Volke R, Herzig H P, Eisner M and Haselbeck S 1997 Pure and Applied Optics 6 617). This limitation in the minimum aspect ratio of the lens results in a shortened focal length of the lens, following fabrication by a conventional thermal resist reflow process, thereby causing a blurry, non-sharp image due to misalignment of the focus plane with the image source.

With this limitation, the lenticular lens array fabricated onto the 3D film is unable to achieve clear 3D imaging due to the lenticular lens array being an out of focus plane of the LCD image source. An optimal focal length is required by the lenticular lens array in order to achieve good 3D imaging.

Thus, what is needed is a lenticular lens array 3D film with a low width dimension (preferably lower than the current 300 µm width resolution of existing film fabrication technologies) and with an ultrasmooth surface to enable visualization of good quality display images in a display's 2D mode and 3D mode, as well as a low aspect ratio lenticular lens structure to allow sufficient focal length to focus the image with its paired image source.

SUMMARY

The present invention overcomes the problems in existing 3D film rough film surfaces and overcomes the limitation of existing thermal resist reflow methods that can only achieve a minimum aspect ratio lenticular lens structure of approximately 0.04.

In order to provide smooth film surface lenticular lens arrays, the present invention employs by design a small width dimension lenticular structure having less than a 300 µm lens width and employs photolithography and thermal resist reflow techniques to achieve a lenticular lens structure having a small lens width dimension with an ultrasmooth surface profile.

In order to achieve a reduced minimum aspect ratio lenticular lens structure, the present invention uses a variation of thermal nanoimprinting by partial filling (described in further detail below with respect to FIGS. 5A to 5H) to fabricate lenticular lens structures having a minimum aspect ratio below 0.04. In accordance with the present embodiment, operating the process temperature of the thermal nanoimprint fabrication process at near or below the glass transition temperature ($T_g$) of the lenticular lens structure's thermoplastic polymer, the high viscosity of the polymer allows control of the partial filling of the polymer to the mold cavities, thereby controlling the height of the final thermal imprinted inverse pattern of the mold.

According to one aspect of the invention, there is provided a method of forming a film with a lenticular lens array, the method comprising providing a substrate; providing a mold having a plurality of nano-scale to micro-scale cavities that form the lenticular lens array on the substrate; having the mold contact the substrate; and forming the lenticular lens array by allowing portions of the substrate to partially fill the plurality of cavities.

BRIEF DESCRIPTION OF THE DRAWINGS

Example embodiments of the invention will be better understood and readily apparent to one of ordinary skill in the art from the following written description, by way of example only, and in conjunction with the drawings. The drawings are not necessarily to scale, emphasis instead generally being placed upon illustrating the principles of the invention, in which:

FIG. 5, comprising

FIG. 7, comprising FIG. 7A depicts the mobile display device without any 3D film, FIG. 7B depicts the mobile display with a conventional 3D film, and FIG. 7C depicts the mobile display device with 3D film fabricated in accordance with the fabrication steps of the present embodiment.

FIG. 8, comprising FIG. 8A depicts a microscopic image of a lenticular lens array fabricated in accordance with the fabrication steps of the present embodiment and FIG. 8B depicts a microscopic image of a lenticular lens array fabricated in accordance with conventional laser writing techniques.

FIG. 9, comprising FIGS. 9A and 9B, shows a 3D film on top of a mobile device displaying in a 3D mode of operation, wherein FIG. 9A depicts the mobile device displaying through a lenticular lens fabricated in accordance with the present embodiment and FIG. 9B depicts the mobile device displaying through a lenticular lens fabricated in accordance with conventional fabrication techniques.

DEFINITIONS

Figure 1:
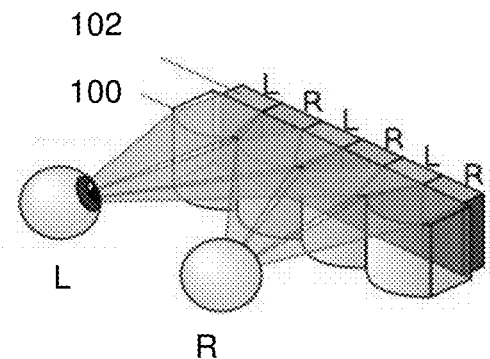
FIG. 1 shows a top, left, front perspective view of a generic lenticular lens array technology for viewing a spectacles-free 3D display.

The following provides sample, but not exhaustive, definitions for expressions used throughout various embodiments of the invention disclosed herein.

The term "film" may mean a thin layer which modulates light that transmits through due to the presence of optical elements present within the thin layer.

The phrase "lenticular lens array" may mean a plurality of lenses arranged in a specific pattern, the lenses and their specific arrangement designed so that when viewed from slightly different angles, different images can be seen. Images seen through the lenticular lens array are given an illusion of depth, or appear to change or move as the images are viewed from different angles.

The word "substrate" may mean a structure, fabricated from any transparent material such as plastic, polymethylmethacrylate, polycarbonate and polyethylene, or glass, serving as a base for the lenticular lens array.

The phrase "cavities" may mean a pattern formed on a mold surface that is used to facilitate the formation of the lenticular lens array on the substrate. Each of the cavities may be a depression providing a hole on the mold surface within which a lens of the lenticular lens array will be formed. The cavities are also sized to accommodate formation of lenses with nanometer to micrometer sized widths, such as between 50 nm to 300 µm, the lenses further having an aspect ratio of less than or equal to 0.04.

The term "aspect ratio" may mean the ratio of the height and width of each lens.

The phrase "portions of the substrate" refer to parts of the substrate that are surrounded by the micro-scale cavities of the mold when the mold is in contact with the substrate.

The phrase "partially fill" may mean that each lens of the lenticular lens array is formed within the space provided by each of the plurality of cavities, so that each lens does not come into contact with the side wall of the respective cavity and this space is not completed filled.

DETAILED DESCRIPTION

In the following description, various embodiments of the invention are described with reference to the drawings, where like reference characters generally refer to the same parts throughout the different views.

Referring to FIG. 1, a lenticular lens structure 100 is shown over a display 102. The display 102 is divided into separate images (L, R) for viewing by the left eye (L) and the right eye (R). The lenticular lens array structure 100 acts as an array of magnifying lenses which, when placed on the surface of a display device (e.g., a liquid crystal display), controls the direction of light emitted from each pixel that is controlled by software, so that when viewed from different angles, different images are magnified to give an illusion of depth with respect to the software-coded pixels. In this manner, the viewer sees a 3D image.

Figure 2:
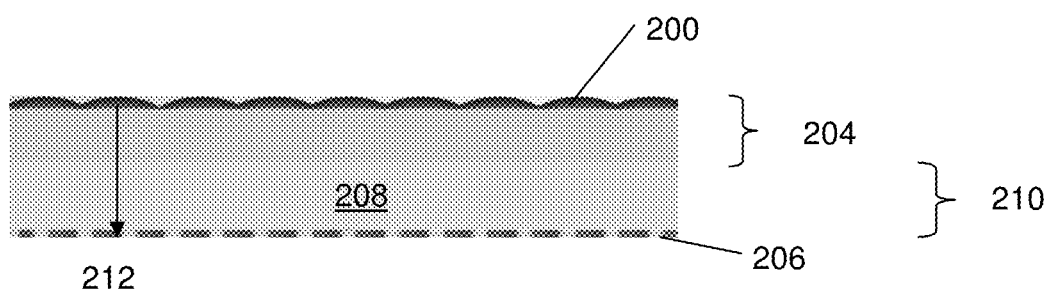
FIG. 2 shows a conventional implementation of a 3D film with a lenticular lens array mounted over an image source on a mobile device.
Figure 9A:
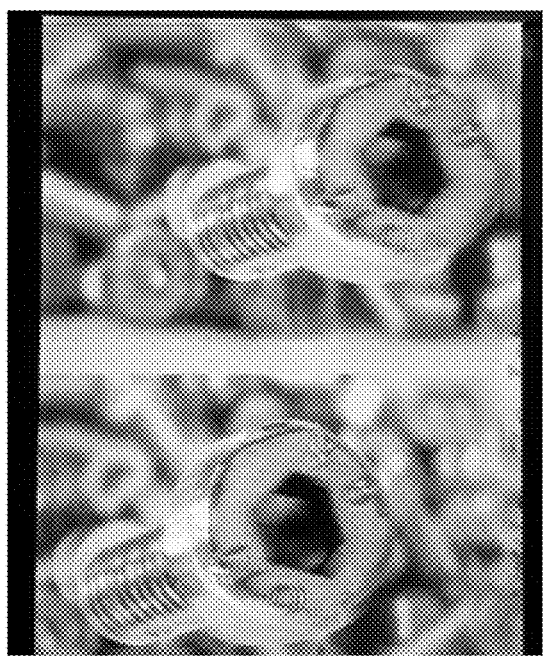
Figure 9B:
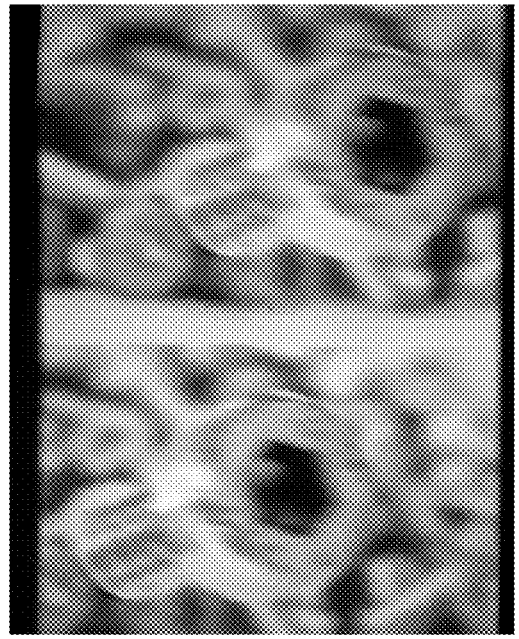

A side planar view of a typical implementation of a film 204 with an array of lenticular lens 200 paired with an image source 206 seen through a glass/plastic screen 208 of a mobile device 210 is shown in FIG. 2. In this conventional implementation, there is an optimum focal length 212 from the lens array 200 to the image source 206. This optimum focal length 212 is a design parameter of the lens array 200 due to the air gap and the thickness of the glass/plastic screen 208 with respect to the image source. However, with a limitation of a minimum aspect ratio (0.04) of the lens array 200, fabricated using a conventional thermal resist reflow method, this causes a shortened focal length of the lens, resulting in a blurry/non-sharp image (as shown in FIG. 9B) due to an out of focus plane with the image source. Reduction of the aspect ratio of a lenticular lens, fabricated using a method in accordance with an embodiment of the invention, results in such a lenticular lens having an optimum focal length that increases the clarity of viewing (as shown in FIG. 9A) of the image source 206.

In accordance with a present embodiment of the invention, a lenticular array structure is fabricated on a film and used for three-dimensional viewing of visual displays. The present embodiment of the invention achieves a symmetric profile and reduced minimum aspect ratio through a variation of conventional thermal nanoimprinting, the variation being partially filling cavities of a mold that is fabricated. The mold allows fabrication of a 3D film having a lenticular lens array for performing spectacles-free 3D viewing. The unique lenticular lens array structure includes a small lens width dimension structure as well as an ultrasmooth surface and low aspect ratio (<0.04) lenticular lens structure fabricated onto a plastic substrate (e.g. a polycarbonate (PC) film). The resulting 3D film allows users to clearly view 3D images without compromising the quality of existing 2D display images when the 3D film is used on the display in 2D mode.

Figure 3A:
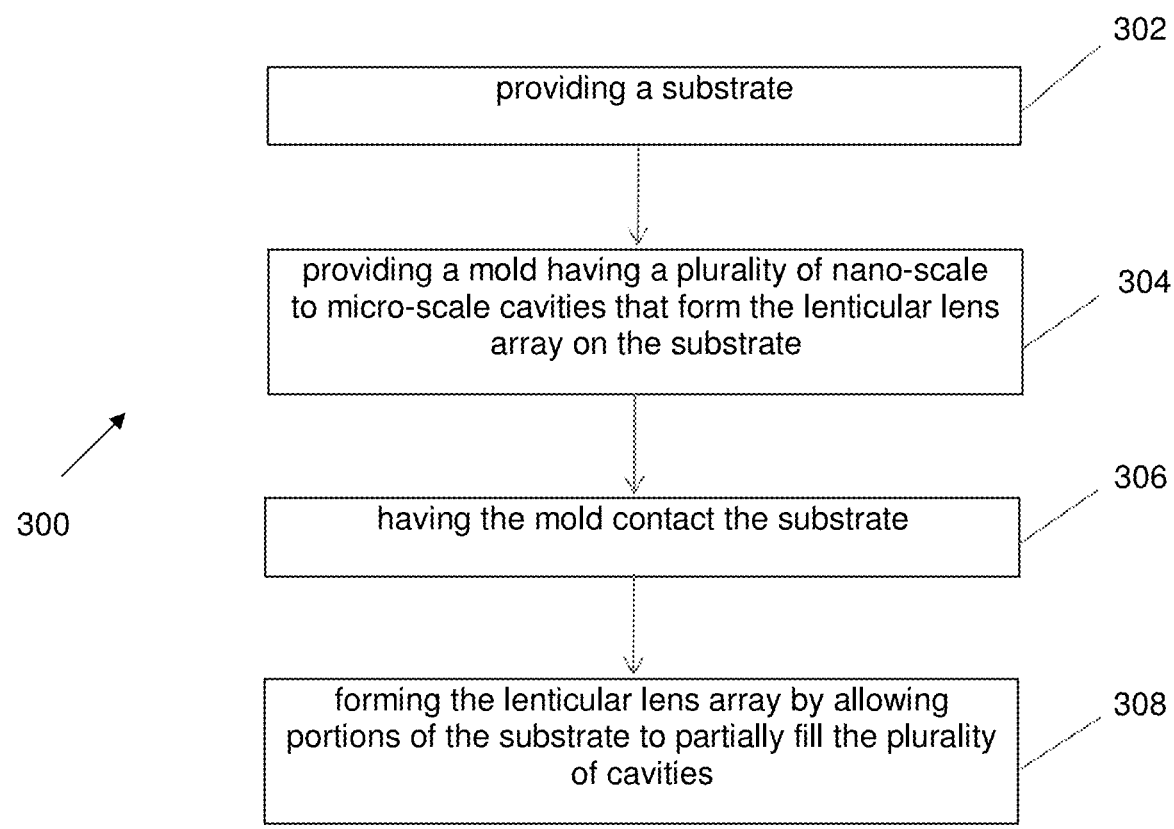
FIG. 3, comprising FIGS. 3A and 3B, has FIG. 3A showing a method for fabricating a film with a lenticular lens array built in accordance with a first embodiment of the invention and FIG. 3B showing an illustration of time-based partial filling of mold cavities by a thermal nanoimprinting process in accordance with an embodiment of the invention.

FIG. 3A shows the flowchart 300 of a method to forming a film with a lenticular lens array built in accordance with a first embodiment of the invention.

In step 302, a substrate is provided. In step 304, a mold is provided, having a plurality of nano-scale to micro-scale cavities that form the lenticular lens array on the substrate. In step 306, contact of the mold with the substrate is made. In step 308, the lenticular lens array is formed by allowing portions of the substrate to partially fill the plurality of cavities.

The dimension of the mold cavities is determined by optical diffraction limit. A dimension of 250 nm is achievable using UV photolithography. If higher resolution lithography, e.g. e-beam lithography, is employed, the dimension of the mold cavities can be reduced from 250 nm to around 50 nm.

Step 308 may be performed using a mechanical process, such as thermal nanoimprinting. However, the thermal nanoimprinting used in step 308 varies from a conventional thermal nanoimprinting process as follows. In a conventional thermal nanoimprint process (not shown), a substrate material is brought at above its glass transition temperature that causes the substrate to be in low viscosity and completely fill up the cavities of the mold. On the other hand, in the embodiment shown in FIG. 3A, the variation from the conventional thermal nanoimprinting fabrication is as follows. The substrate (which can be made from, for example, polymer material) is brought to around its glass transition temperature, so that, for example, the formation of the lenticular lens array occurs at a range of around 10° below or above the glass transition temperature of the substrate. This causes the substrate to be in high viscosity. The high viscosity of the polymer allows control that can achieve partial filling of the polymer into the mold cavities. An aspect ratio of each lens of the lenticular lens array may be adjusted by controlling an extent to which the portions of the substrate partially fill the plurality of cavities through a period of time t, at a fixed pressure. For instance, the formation of the lenticular lens array may occur at a pressure of around 10 Bar to 60 Bar. Such control is depicted in FIG. 3B.

Figure 3B:
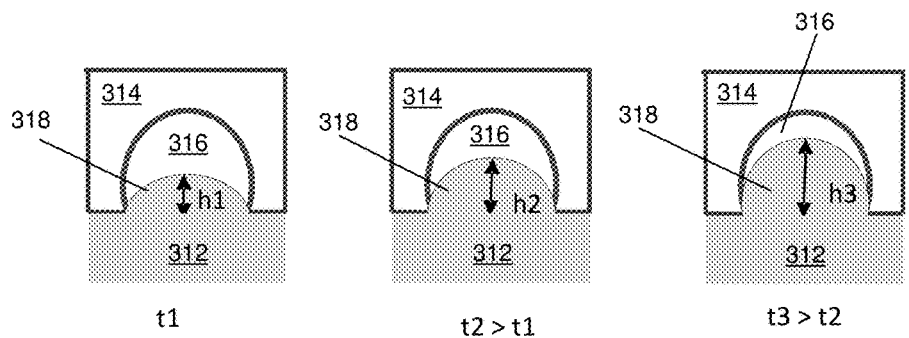

Referring to FIG. 3B, one aspect of thermal nanoimprinting fabrication, in accordance with an embodiment of the invention, is depicted. FIG. 3B shows three different substrates 312 having a lenticular lens array (although only one lens 318 is shown). As described above, the formation of the lenticular lens array may occur at below or around the glass transition temperature of the substrate 312. In each substrate 312, the lens 318 is fabricated by partially filling the plurality of cavities 316 through different times t1, t2 and t3 to form different heights h1, h2 and h3. Fabrication of the lenticular lens array is facilitated by a mold 314 having a plurality of nano-scale to micro-scale cavities 316 (although only one cavity is shown). The substrate 312 is fabricated from step 302 of FIG. 3A. The mold 314 having the plurality of nano-scale to micro-scale cavities 316 is provided and made to contact the substrate 312 as described in steps 304 and 306 of FIG. 3A. An exemplary set of conditions where the formation of the lenticular lens array on a substrate may occur is at a temperature of 150° C. and a pressure of 30 Bar, for instance when polycarbonate material is used for the substrate 312.

FIG. 3B shows a lens 318 of the lenticular lens array formed on the substrate 312 by varying a duration t over which the lenticular lens array is formed to control the extent to which the portions of the substrate 312 partially fill the plurality of cavities 316. As shown by the schematic illustrations, varying the timing of heating, t, while imprinting with the mold allows one to tune the height, h, of the imprinted pattern through partial filling of polymers in the cavities 316 of the mold 314. A longer heating duration (t3>t2>t1) leads to a greater lens 318 height (h3>h2>h1). This allows the timing to determine the aspect ratios of the nanoimprinted structures. According to various embodiments of the invention, the aspect ratio of each lens 318 may be less than or equal to 0.04.

Each lens 318 of the lenticular lens array has a symmetric cross-sectional profile. Each lens 318 is generally symmetric about a longitudinal axis extending along a centre and intersecting a base of the respective lens.

Figure 4:
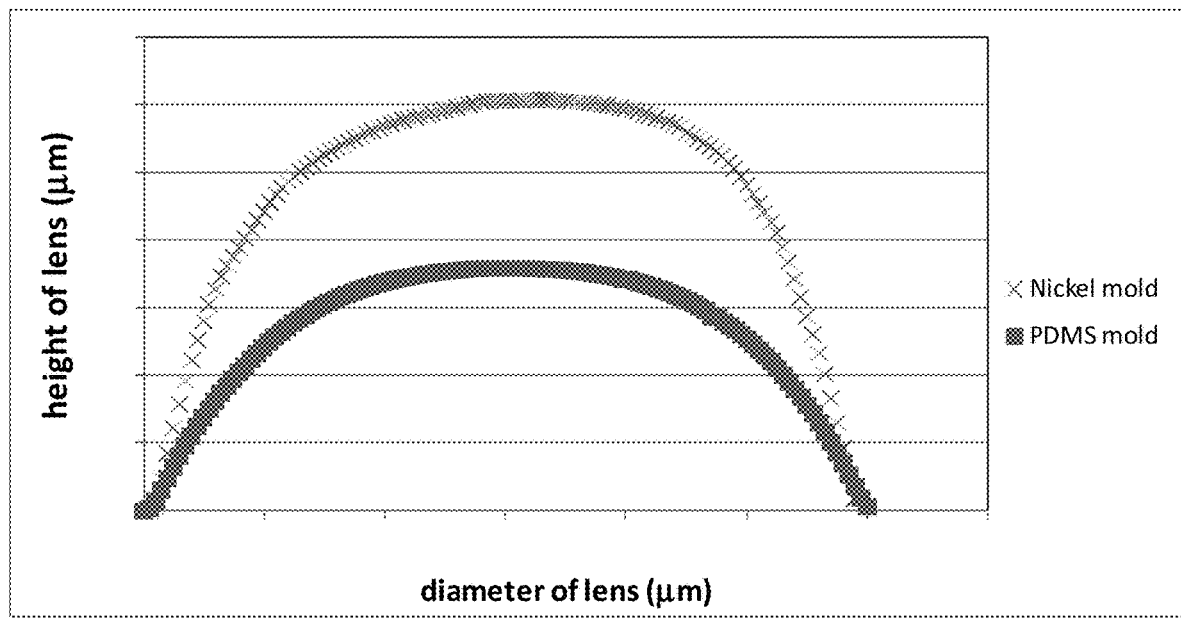
FIG. 4 shows a graph depicting how the choice of mold material affects the symmetry of a fabricated lenticular lens profile when employing thermal nanoimprinting by partial filling in accordance with FIG. 3.

In addition, referring to FIG. 4, the choice of mold material used for thermal nanoimprinting by partial filling method affects the symmetry profile of the fabricated lens structure. In FIG. 4, a symmetric lens profile can be achieved through the use of, for example but not limited to, a polydimethylsiloxane (PDMS)-type mold. On the other hand, a nickel mold yields a non-symmetric lens profile which has a detrimental effect for the 3D film as it affects the focusing plane for 3D imaging.

Thus, fabrication of a lenticular lens array using the method described with respect to FIG. 3A achieves a symmetric profile and reduced minimum aspect ratio, thereby fabricating a 3D film having a lenticular lens array for performing spectacles-free 3D viewing. Referring to FIG. 5, including FIGS. 5A to 5H, a method for fabrication of a plastic 3D film in accordance with the method described with respect to FIG. 3A is disclosed.

Figure 5A:
FIGS. 5A to 5H, shows process steps for fabrication of a smooth surface and low aspect ratio lenticular lens array in accordance with a present embodiment.

FIG. 5A depicts a layer 504 of common positive photo resist spin coated onto a wafer 502 cleaned with sulphuric acid and hydrogen peroxide and pre-treated with HMDS (hexamethyldisilazane). The resist-coated wafer 506 is placed on a hot plate for a soft bake process conducted at approximately 110-120° C. for 180 to 300 seconds. The wafer 506 was then left to cool down to room temperature.

Figure 5E:
Figure 5B:
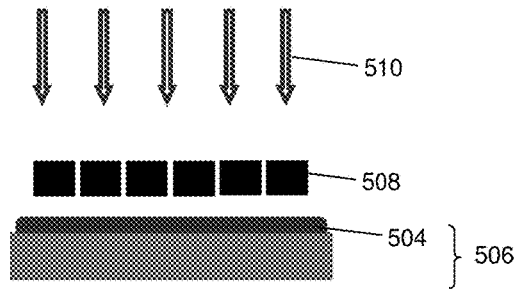

Referring to FIG. 5B, ultraviolet (UV) photolithography 510 is performed to transfer a rectangular grating array design on a photo mask (pattern mask) 508 to the resist coated wafer 506. This resist coated wafer 506 will later be used as a template from which a mold is cast to create a lenticular lens array according to the invention (such as those shown in FIG. 3A). The UV exposure dose can range from 340 mJ/cm$^2$ to 450 mJ/cm$^2$ depending on the thickness and type of the resist 504 and the duration of the UV exposure.

Figure 5F:
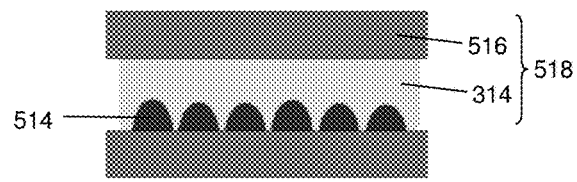
Figure 5C:

Referring to FIG. 5C, resist development is performed using a common positive developer, followed by DI water rinsing, before drying with nitrogen gas. This forms the grating resist structure 512 on the wafer 502. Referring to FIG. 5D, thermal resist reflow is conducted on a hot plate at a temperature ranging from 150-170° C. for from 5 to 30 minutes to form a lenticular lens array 514 with an aspect ratio (H/W) equal to or greater than 0.04. The lenticular lens array 514 fabricated at this step is a master mold used to form a soft mold for subsequent steps.

Referring to FIG. 5E, the master mold 514 is coated with a layer of anti-stiction monolayer (FDTS, (1H,1H,2H,2H)-Perfluorodecyltrichlorosilane). Prior to forming a PDMS soft mold 314 with an inverse lenticular lens array pattern fabricated from the master mold 514, PDMS (with a base to curing agent ratio of 10:1) is spin-coated (not shown) onto another cleaned wafer 516 which has been oxygen plasma-treated for adhesion promotion. As shown in FIG. 5F, the PDMS coated wafer 518 is brought in close contact with the master mold 514, whereby the PDMS soft mold 314 is fabricated utilizing a nanoimprinter system (such as Obducat) to apply a pressure of 40 Bar for 120 seconds on the PDMS coated wafer 518. This is followed by a curing temperature of 100° C. at 40 Bar for 120 seconds. Subsequently, the PDMS coated wafer 518 is subject to an 80° C.

curing temperature at 40 Bar for 120 seconds followed by a 50° C. curing temperature at 40 Bar for 120 seconds before demolding (not shown). The PDMS coated wafer 518 is then placed in an oven and cured for another 4 hours at 70° C. to ensure full curing of the PDMS soft mold 314.

Figure 5G:
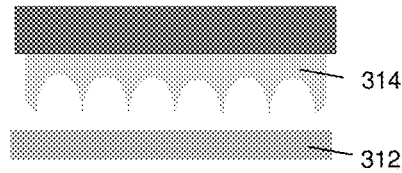
Figure 5D:
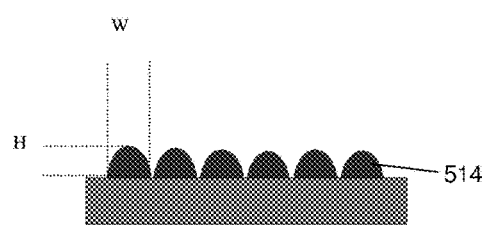
Figure 5H:
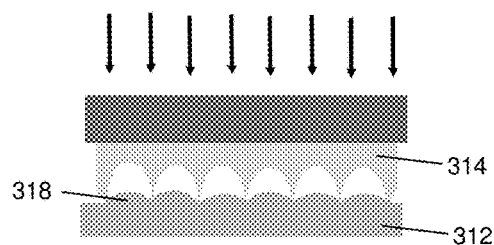

Referring to FIG. 5G, the cured PDMS soft mold 314 is coated with a layer of anti-stiction monolayer (FDTS,(1H, 1H,2H,2H)-Perfluorodecyltrichlorosilane). Thermal nanoimprinting, in accordance with an embodiment of the invention, using a partial filling step (as shown and described with reference to FIG. 3B and therefore not further elaborated upon) is then performed (see FIG. 5H) using the PDMS soft mold 314 onto a substrate 312 of polycarbonate (PC). Other materials such as plastic, polymethylmethacrylate, and polyethylene may also be used for the substrate 312, thereby providing the substrate 312 with flexible properties. Optimized conditions to obtain a lenticular lens array, having a plurality of lens 318 each having an aspect ratio of ≤1.04, for a polycarbonate sheet in accordance with the present embodiment includes a process temperature of 150° C. at 30 Bar for 300 seconds, followed by demolding at 35° C.

Using the process shown in FIGS. 5A to 5G, each lens 318 can have a width of less than 300 μm. With reference to FIG. 3B, A dimension of 250 nm is achievable using UV photolithography. If higher resolution lithography, e.g. e-beam lithography (not shown), is employed, the dimension of the mold cavities can be reduced from 250 nm to around 50 nm.

Figure 6:
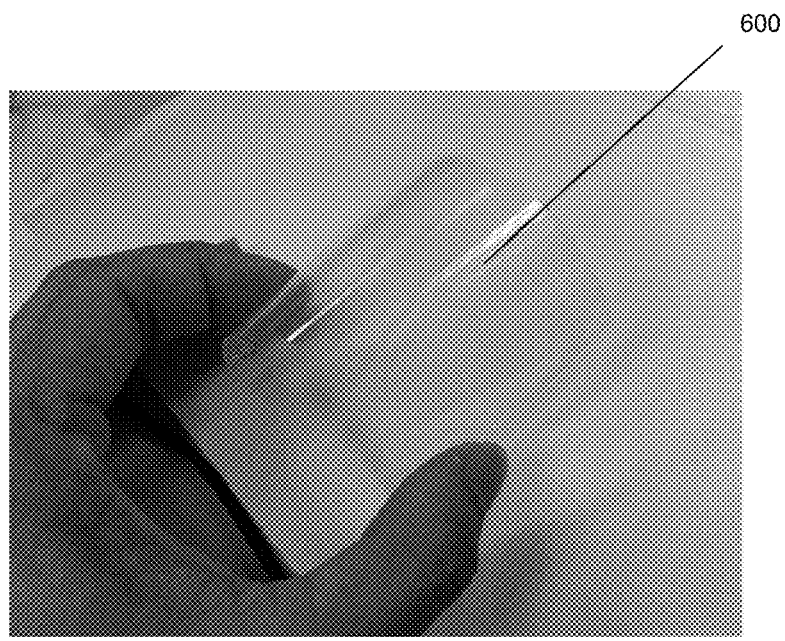
FIG. 6 shows 3D film fabricated onto flexible plastic polycarbonate film in accordance with the fabrication steps of the present embodiment.

As can be seen, processing in accordance with the embodiment described with respect to FIGS. 5A to 5G achieves smoother surfaces than typical lenticular lens array structures fabricated by conventional techniques, e.g. laser writing technique. Furthermore, processing, in accordance with an embodiment of the invention, can extend below the aspect ratio limit at 0.04 (Height/width) of lenticular lens array structure fabricated from conventional reflow methods. In addition, a 3D film fabricated on a plastic polycarbonate sheet 600, in accordance with the embodiment described with respect to FIGS. 5A to 5G, is highly flexible as shown in FIG. 6.

Figures 7A, 7B, 7C:
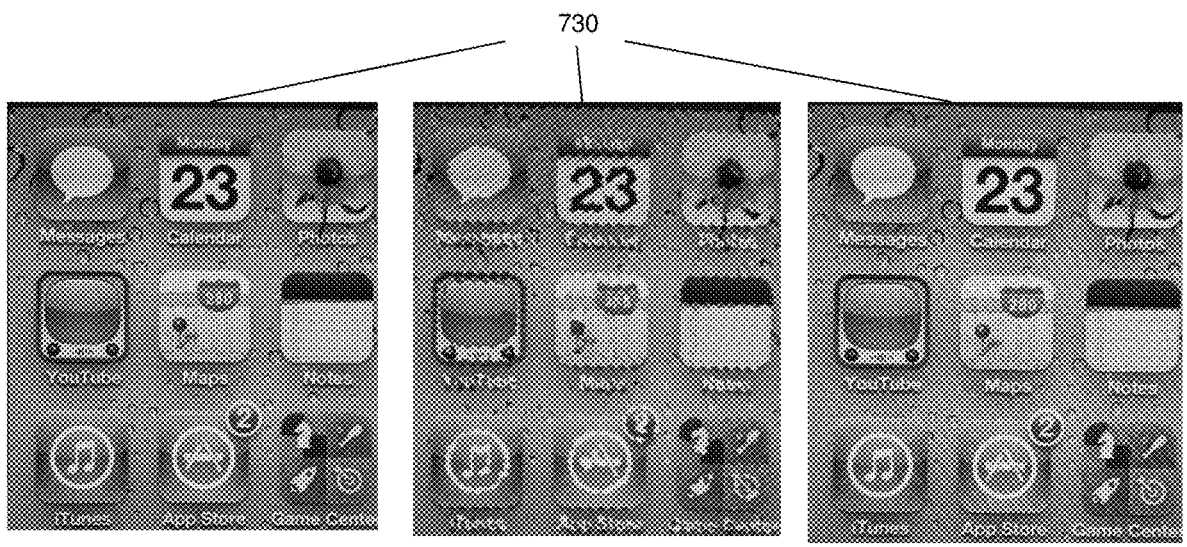
FIGS. 7A to 7C, shows a mobile display device displaying in a 2D display mode where

Referring to FIGS. 7A to 7B, improved viewing of a mobile display 730 using a lenticular lens array film fabricated in accordance with the embodiment described with respect to FIGS. 5A to 5G is shown. FIG. 7A shows the mobile device display 730 operating in normal 2D mode without any 3D film. FIG. 7B shows the mobile device display 730 operating in the 2D mode with a conventional 3D film. FIG. 7C shows the mobile device display 730 operating in the 2D mode with a 3D film in accordance with the present embodiment. As can be seen, the smoothness of the 3D film in accordance with the present embodiment does not distort the quality of the 2D mode display. In contrast, the conventional 3D film shows a visible rough film surface which distorts the normal 2D mode display images.

Figure 8A:
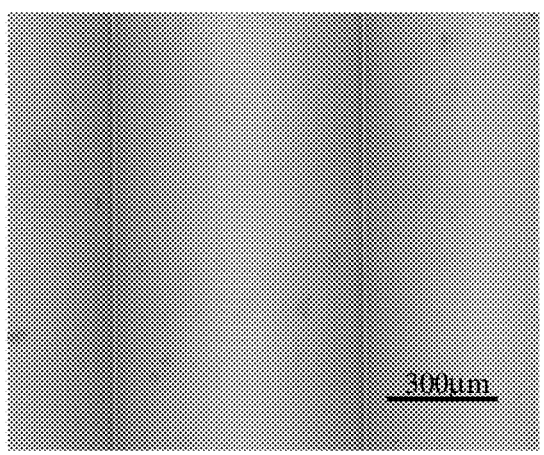
FIGS. 8A and 8B, shows microscopic images of fabricated lenticular lens array, where
Figure 8B:
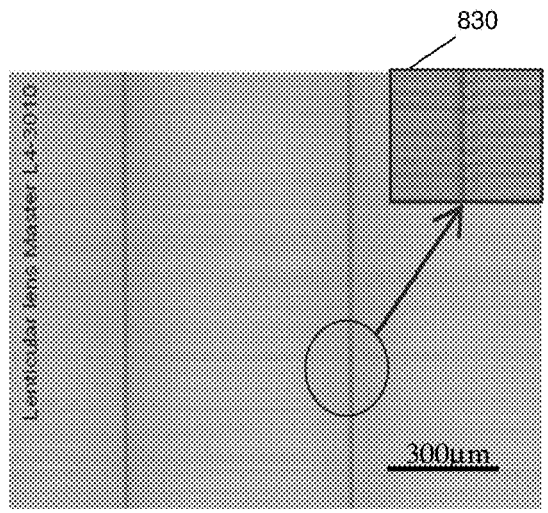

Microscopic imaging of the films also shows the smoother surface of the film fabricated in accordance with the embodiment described with respect to FIGS. 5A to 5G, as compared to a conventional 3D film. FIG. 8A depicts a microscopic image of the 3D film in accordance with the present embodiment while FIG. 8B depicts a microscopic image of the conventional film used in FIG. 7B. The width of the lens in FIG. 8A is fabricated to be similar to that of the lens in FIG. 8B for comparison of surface roughness, with both lens width being around 300 μm. The conventional 3D film was fabricated by conventional laser writing technique and shows a microscopically rough surface seen in the view of FIG. 8B and in the further enlarged view of the insert 830 thereof. However, it will be appreciated that, the width of the lens of FIG. 8A can be fabricated below 300 μm, as described above with respect to FIGS. 5A to 5G.

FIG. 9A shows sharp 3D images viewable using a lenticular lens array 3D film fabricated in accordance with the embodiment described with respect to FIGS. 5A to 5G on a mobile display device operating in the 3D mode. The 3D film in accordance with the present embodiment is composed of a lenticular lens array fabricated with a low aspect ratio (<0.04) using the fabrication method described with respect to FIGS. 5A to 5G. In contrast, referring to FIG. 9B, a 3D film with the same lenticular lens array but at an aspect ratio of 0.04 (the aspect ratio limitation of existing fabrication means) displays a blurred image on a mobile display device operating in the 3D mode.

From FIGS. 7C and 9A, a display, configured to generate two dimensional (2D) content and three dimensional (3D) content, can comprise a film built in accordance with an embodiment of the invention. This enables spectacles-free three-dimensional (3D) viewing seen through the same display of three-dimensional (3D) content. Thus, it can be seen that fabrication in accordance with the embodiment described with respect to FIGS. 5A to 5G achieves a lenticular lens type 3D film with a small lens width, an ultrasmooth surface and a low aspect ratio lens structure to allow clear 3D imaging, without compromising the quality of existing 2D display images when used on the display during 2D display operation. The features of small lens width (i.e., <300 μm lens width) and ultrasmooth surfaces are achieved by employing photolithography and thermal resist reflow methodologies in accordance with the present embodiment. The feature of a low aspect ratio below 0.04 is achieved using thermal nanoimprinting by partial filling in accordance with the present embodiment. In addition, in accordance with the present embodiment PDMS mold material is utilized in order to yield a symmetric lens profile.

It will be appreciated by a person skilled in the art that numerous variations and/or modifications may be made to the present invention as shown in the embodiments without departing from a spirit or scope of the invention as broadly described. The embodiments are, therefore, to be considered in all respects to be illustrative and not restrictive.

The invention claimed is:

1. A method of forming a film with a lenticular lens array wherein each lens of the lenticular lens array has an optimum focal length, the method comprising:
   providing a substrate;
   providing a mold having a plurality of nano-scale to micro-scale cavities that form the lenticular lens array on the substrate, wherein each of the plurality of cavities forms a depression within the mold having dimensions between 50 nm and 250 nm and provide a hole on a surface of the mold;
   having the surface of the mold contact the substrate; and forming the lenticular lens array, wherein the step of forming the lenticular lens array comprises:
   increasing a temperature of the substrate to within 100 below and 100 above its glass transition temperature to cause the substrate to be in high viscosity;
   applying a fixed pressure to compress the mold against the substrate for a controlled time duration while the substrate is in high viscosity to allow portions of the substrate to partially fill the plurality of cavities to form the plurality of lenses; and
   reducing the temperature after the controlled time for demolding the mold from the substrate,
   wherein the controlled time duration controls an extent to which the portions of the substrate partially fill the plurality of cavities to adjust an aspect ratio of each lens of the lenticular lens array so that each lens of the lenticular lens array has an optimum focal length.

2. The method of claim 1, wherein the aspect ratio of each lens is less than or equal to 0.04.

3. The method of claim 1, wherein each lens of the lenticular lens array has a symmetric cross-sectional profile.

4. The method of claim 3, wherein each lens is generally symmetric about a longitudinal axis extending along a centre and intersecting a base of the respective lens.

5. The method of claim 1, wherein the fixed pressure is a pressure of around 10 Bar to 60 Bar.

6. The method of claim 1, wherein the mold comprises polydimethylsiloxane (PDMS).

7. The method of claim 1, wherein reducing the temperature for demolding comprises reducing the temperature to 35° C. after the controlled time to demold the mold from the substrate.

* * * * *